July 13, 1954 A. B. YANUS ET AL 2,683,281
SHRIMP DEVEINING AND DESHELLING MACHINE
Filed Jan. 21, 1950 6 Sheets-Sheet 3

FIG. 5

INVENTORS.
ALBERT B. YANUS
LOUIS L. CERNY
BY
Hyde, Meyer, Baldwin & Doran
ATTORNEYS Patented July 13, 1954

2,683,281

UNITED STATES PATENT OFFICE 2,683,281

SHRIMP DEVEINING AND DESHELLING MACHINE

Albert B. Yanus, Parma, and Louis L. Cerny, Cleveland, Ohio, assignors, by direct and mesne assignments, to The Alpha Shrimp Machine Corporation, Cleveland, Ohio, a corporation of Ohio Application January 21, 1950, Serial No. 139,862

6 Claims. (Cl. 17—2)

This invention relates to improvements in a machine for deveining and deshelling small crustaceans such as shrimp.

One of the objects of the present invention is to provide novel apparatus for presenting shrimp, one after the other, to a deveining device such as a saw for sawing through the vein of the shrimp and then to a deshelling device where the body of the shrimp is squeezed out of the shell.

Another object of the present invention is to provide novel means for holding and feeding shrimp first through a deveining apparatus and then through a deshelling apparatus.

Another object of the present invention is to provide novel means for holding the body of a shrimp on a feeding table or the like.

Still another object of the present invention is to provide automatic means for unclamping the body of a shrimp prior to the deshelling action.

Still another object of the present invention is to provide novel means for removing the shell from a shrimp including novel means for feeding the body of a shrimp into deshelling rolls.

A further object of the invention is to provide novel means for mounting a deveining saw.

Another object of the invention is to provide a novel sawing operation for aiding the deveining process.

Other objects and advantages of our invention will be apparent from the accompanying drawings and description and the essential features will be set forth in the appended claims.

In the drawings,

Fig. 12 is a fragmental sectional view enlarged taken along the line 12—12 of Fig. 5; while

Figure 1:
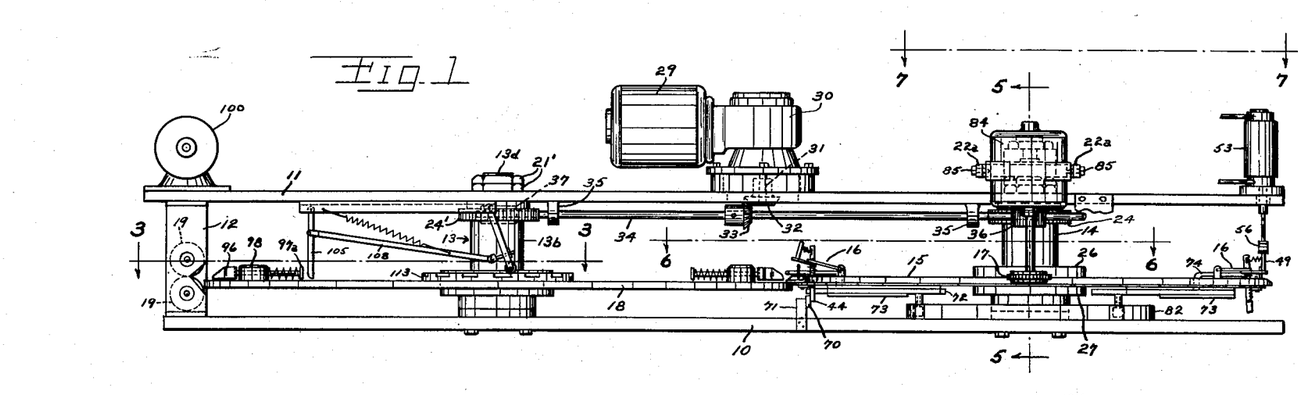
Fig. 1 is a side elevational view of apparatus embodying our invention.
Figure 2:
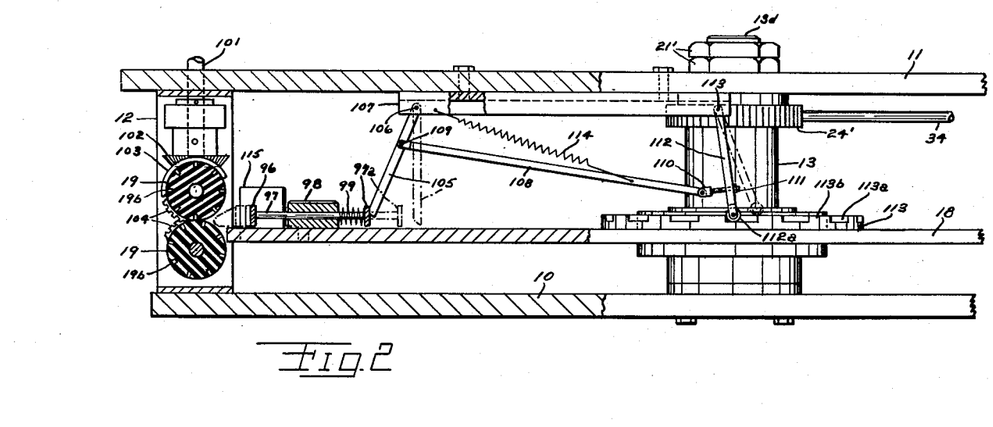
Fig. 2 is a fragmental sectional view taken along the line 2—2 of Fig. 3 and showing a portion at the left-hand end of Fig. 1 enlarged.
Figure 3:
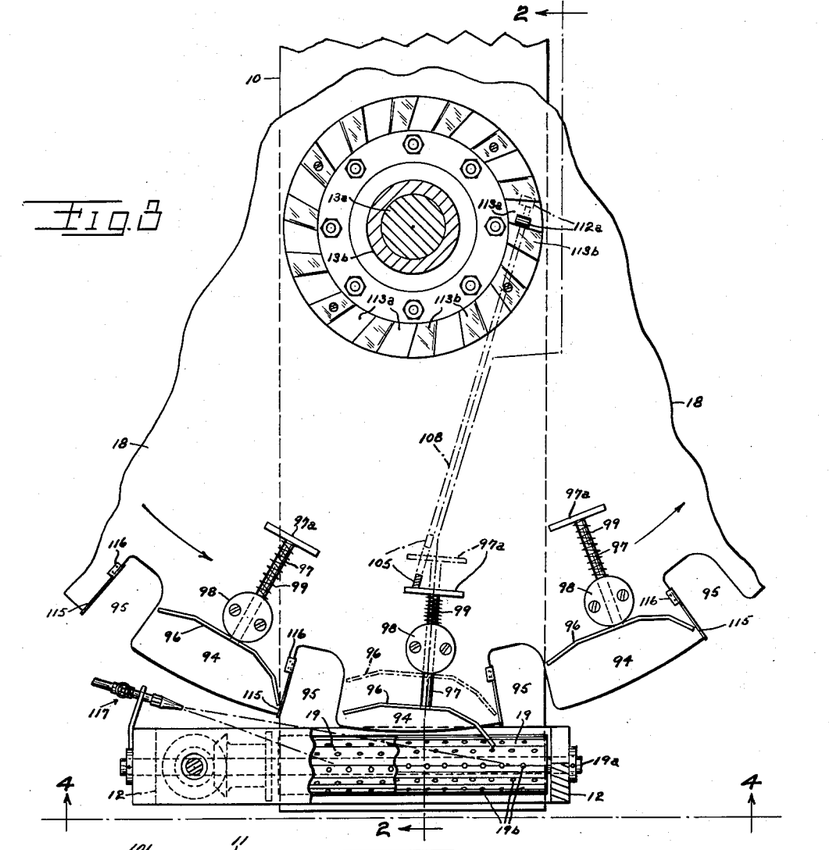
Fig. 3 is fragmental sectional view enlarged taken along the line 3—3 of Fig. 1.
Figure 5:
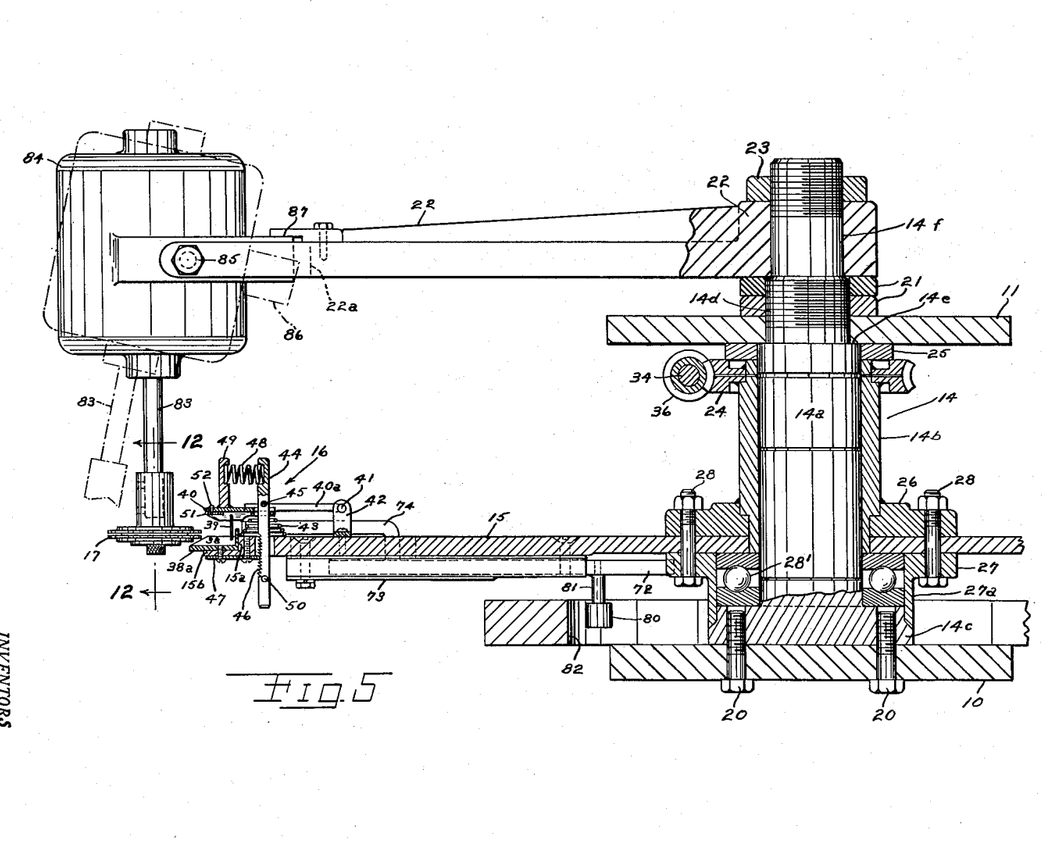
Fig. 5 is a sectional view enlarged taken along the line 5—5 of Fig. 1.
Figure 6:
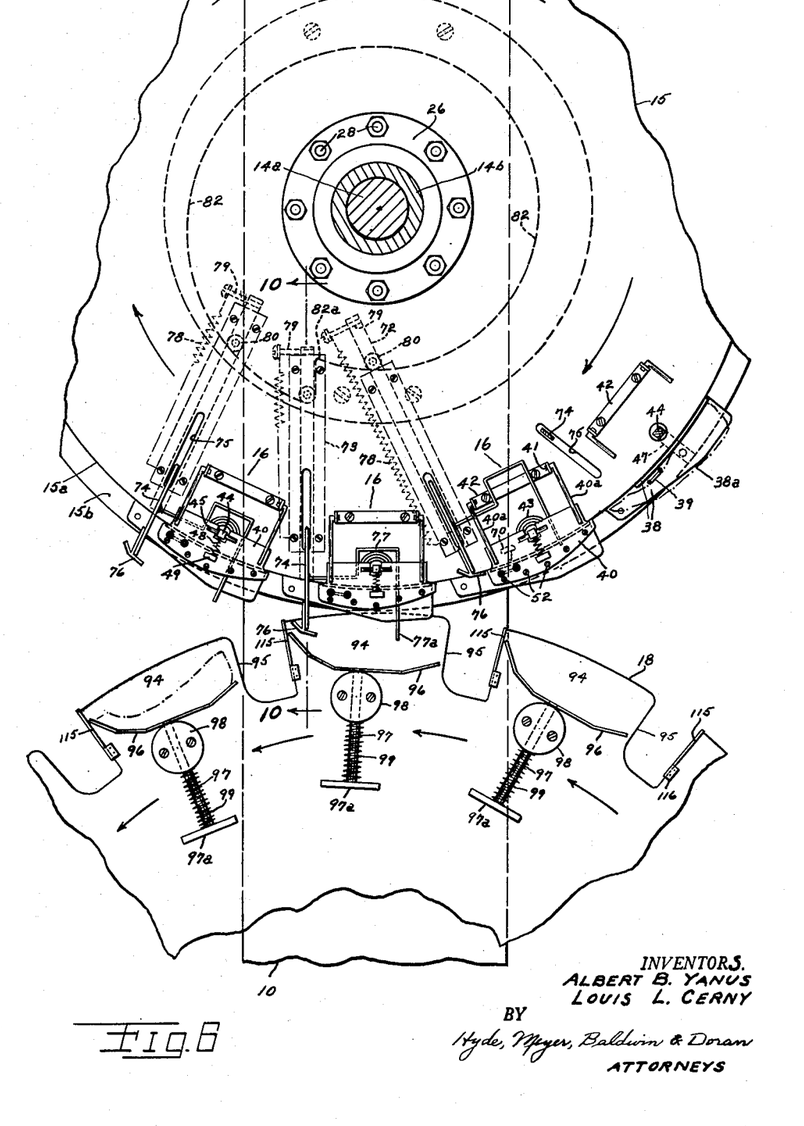
Fig. 6 is a fragmental view enlarged taken along the line 6—6 of Fig. 1 and being mostly in top plan view with a portion in section.

Referring to Fig. 1, our invention comprises a lower frame base plate 10 and an upper frame plate 11 which are generally parallel. These two plates are held in their spaced relation by means of the roller supporting frame 12 at the left-hand end and by the deshelling table post 13, and by the deveining table post 14. Referring to Figs. 3, 5 and 6, in addition to Fig. 1, a deveining table 15 is rotatable about the post 14. This table carries at its periphery a plurality of shrimp clamping stations 16. While moving about the table 15, in clamped position, each shrimp has its vein removed by a sawing operation which includes the small rotatable saw 17 mounted to saw a short distance into the back of each shrimp along the entire length thereof as the shrimp passes the saw. A deshelling table 18 is rotatable about the post 13. At the point of tangency between these two tables, as clearly shown in Fig. 6, each shrimp is unclamped and then pushed from table 15 onto table 18, where the shrimp lies in unclamped condition as table 18 carries it approximately one-hundred eighty degrees to a pair of deshelling rollers 19. As the shrimp approaches the rollers, a pushing device feeds the shrimp toward the rollers 19 which pull the shell off the body of shrimp after which the shrimp drops through a suitable opening in the table 18 both deveined and deshelled.

Referring to Fig. 5, the post 14 is a composite assembly comprising a central post proper 14a about which rotates a sleeve 14b. The lower end of post 14a has a flange 14c which is secured by bolts 20 to the base plate 10. The upper portion of post 14a has a portion of reduced diameter 14d which passes through a suitable opening in the plate 11. Two lock nuts 21 clamp the plate 11 against the shoulder 14e on the post. Thus the post provides spacing means between plates 11 and 10 at this point. The uppermost portion of the post has a further reduced diameter 14f to which there is secured an arm 22 by means of a nut 23. On the upper end of sleeve 14b there is rigidly secured, as by welding, a worm wheel 24 by which table 15 is rotated as will presently appear. A wear collar 25 is positioned between plate 11 and the upper end of sleeve 14b. To the lower end of sleeve 14b there is secured as by welding a flange 26, which rests upon the upper surface of table 15. Below table 15 is an annular collar 27 and bolts 28 secure table 15 between flange 26 and collar 27. Collar 27 has a depending flange 27a which extends downwardly to a point adjacent the flange 14c of the central post. In the space radially inward from flange 27a there is provided a friction reducing bearing 28', which supports table 15 and sleeve 14b for free rotation about the central post 14a.

Post 13 is exactly like post 14 up to the post portion 13d which is equivalent to 14d and the lock nuts 21' which are equivalent to the lock nuts 21 previously described. The worm wheel 24' is exactly like the worm wheel 24 and serves to rotate the sleeve 13b and table 18 in the same manner as worm wheel 24 serves to rotate sleeve 14b and table 15.

The means for driving worm wheel 24 and 24' is here shown as an electric motor 29 driving a speed reduction member 30, all of which is rigidly mounted on the plate 11. The electric wiring for feeding motor 29 has been omitted for clearness. The final drive shaft 31 from the speed reduction gearing carries a bevel gear 32 which in turn meshes with a bevel gear 33 which is pinned to shaft 34 which lies beneath and parallel to the plate 11, being supported in bearing brackets 35. A worm 36, rotatable with shaft 34, meshes with worm wheel 24 to rotate table 15. A worm 37, rotatable with shaft 34, meshes with worm wheel 24' to rotate table 18. The worms 36 and 37 are on opposite sides of their respective worm wheels so that, as viewed in Fig. 6, table 15 is rotated in clockwise direction and table 18 is rotated in counter-clockwise direction. Referring chiefly to Figs. 5 and 6, there are a plurality of stations 16 spaced around the periphery of table 15, each station being adapted to clamp a single shrimp on the periphery of the feed table 15 so as to feed the shrimp to the deveining device. In one form of our device there are fourteen such stations spaced evenly about the periphery of the table 15. Since each of these is alike, one only of them will be described. Extending around the entire periphery of table 15 is an annular shoulder 15a beneath which a flange 15b extends radially outwardly to provide a shelf. At each clamping station, an L-shape wedge plate 38 is secured to flange 15b. A horizontal portion 38a of this plate rests upon the shelf 15b and is secured thereto as by screws. The leading edge of the plate portion 38a is narrower measured in a radial direction than the trailing edge thereof. The tail of the shrimp is placed at the leading edge and the body portion toward the trailing edge. A stop member 39 is provided upstanding from the plate portion 38a so as to position the thinner portion, or second joint, of the shrimp between the body and the tail against these two pins in the position indicated in dot-dash lines in Fig. 6 toward the right-hand side thereof. At each clamping station, a movable clamp plate 40 is provided to engage the upper side of the body of the shrimp. This clamp plate has a pair of arms 40a extending radially inwardly and pivotally mounted at 41 in a bracket 42 extending upwardly from the table 15. A conical shape coil spring 43 between plate 40 and table 15 biases plate 40 upwardly. A lock pin 44 is pivotally mounted to plate 40 at the point 45. Below table 15, the radially outermost face of pin 44 is provided with a series of fine ratchet teeth 46. These are adapted to engage against a retaining plate 47 which is secured on the underside of the shelf 15b. The teeth 46 are normally urged toward the plate 47 by means of a coil spring 48 which is held between the upper end of pin 44 and a bracket 49 upstanding from plate 40. It results from this construction, that when the plate 40 is clamped down upon the shrimp, one of the ratchet teeth 46 will engage the plate 47 to hold plate 40 in clamping position. A pin 50 on pin 44 is adapted to engage the underside of table 15 so as to limit the upward movement of clamping plate 40 under the influence of spring 43. Preferably, but not necessarily, a roughened surface is provided on the radially outermost side of clamping plate 40, where it engages the shrimp, as by means of a roughened plate 51 screwed to plate 40 by the screws 52, or otherwise. This aids in clamping the shrimp firmly in position for the deveining action.

Figure 7:
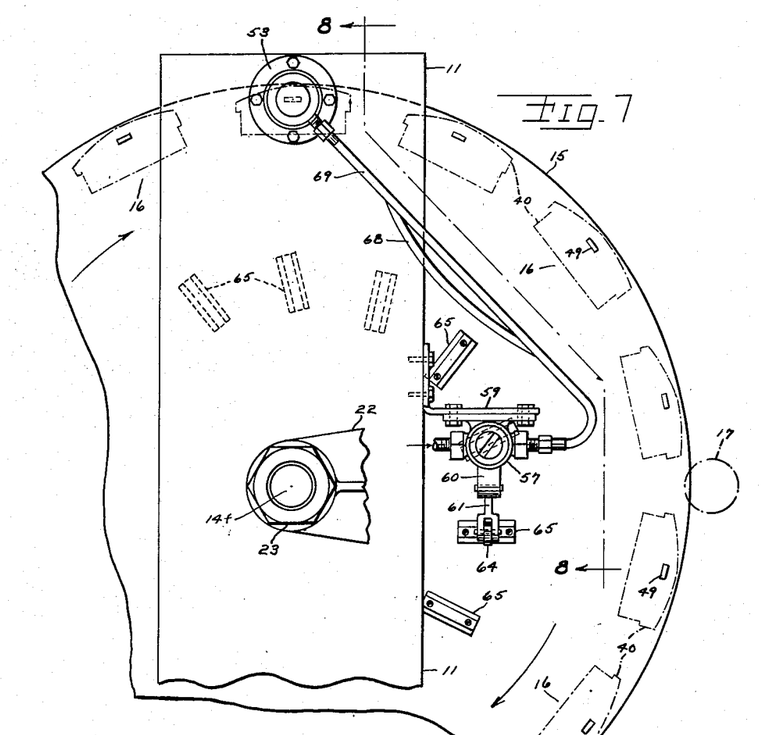
Fig. 7 is a fragmental enlarged top plan view taken from the position of the line 7—7 of Fig. 1.
Figures 8, 9, 10, 11:
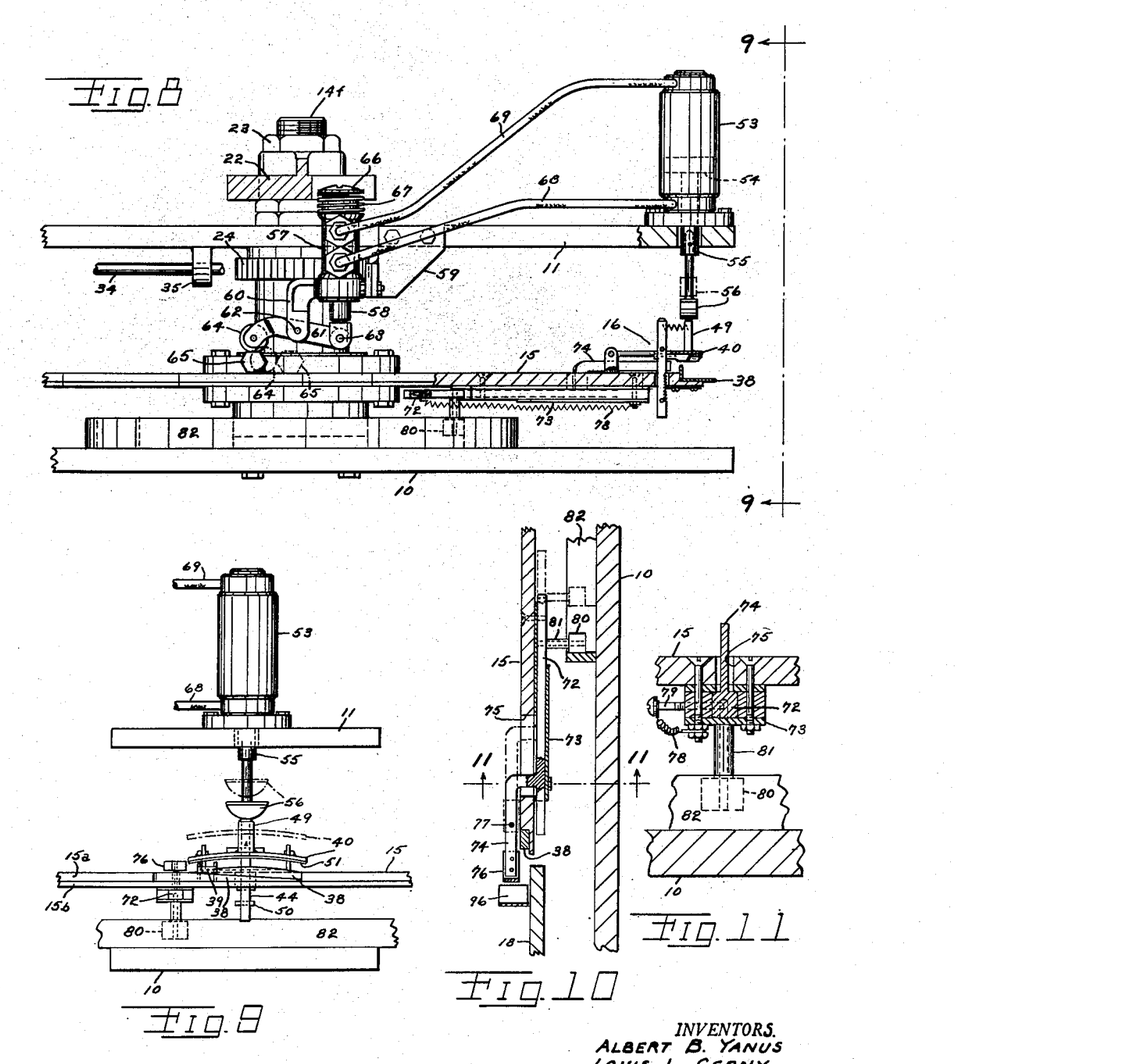
Fig. 8 is a fragmental view mostly in elevation but with certain portions broken away in section and taken along the line 8—8 of Fig. 7.
Fig. 9 is a fragmental end elevational view taken from the position of the line 9—9 of Fig. 8.
Fig. 10 is a fragmental sectional view taken along the line 10—10 of Fig. 6.
Fig. 11 is a fragmental sectional view taken along the line 11—11 of Fig. 10.

Each clamping plate 40 may be moved downwardly by hand to clamp a shrimp in place, but we prefer to do this operation automatically as clearly shown in Figs. 7, 8 and 9. At the outermost end of plate 11 and axially aligned over the path of travel of the bracket or post 49 on top of each plate 40, we mount a pneumatic cylinder 53 within which is a reciprocating piston 54 having a piston rod 55 on the lower end of which is fixed a head 56. An air valve 57 of piston type having a piston rod 58 is mounted in fixed position by means of a bracket 59 secured to plate 11. A fixed bracket 60 pivotally mounts an operating lever 61 at pivot 62. One end of lever 61 is pivotally connected at 63 to the lower end of piston rod 58. The other end of lever 61 carries a roller 64 which is adapted to strike and ride over a plurality of cams 65 secured in a circle on the upper face of table 15. Preferably, each of these cams is cheaply formed of a piece of hexagon bar. To the upper end of the piston valve there is secured a head 66 and a spring 67 acting beneath this head serves to urge the piston valve always toward its uppermost position. The devices 53 and 57 are of known type. A source of compressed air is connected to the valve 57 by means not shown. When the piston valve 57 is in its normal or uppermost position, the roller 64 is in the dot-dash position of Fig. 8, piston 54 is in its uppermost position because air is being fed through line 68 beneath piston 54, and the head 56 is in the dot-dash position as shown in Fig. 8. As each clamping plate 40 passes beneath cylinder 53, the associated cam 65 on table 15 carries roller 64 upwardly to the full line position of Fig. 8. This rocks lever 61 carrying the piston rod 58 downwardly and causing air to pass through conduits 69 to the upper end of cylinder 53 so as to drive piston 54 suddenly downwardly causing the head 56 to strike the post or bracket 49, whereby the movable clamping plate 40 is pushed downwardly on the body of a shrimp which an operator is holding in proper position on the plate portion 38. It will be understood that when air under pressure is being fed through either conduit 68 or 69, the other conduit becomes an exhaust line and is open to the atmosphere through the valve 57. It results from this construction that the clamping head 56 presses each clamping plate 40 down with a yieldable clamping action against the body of the shrimp. By properly regulating the pressure of the air in cylinder 53, we arrange to firmly clamp the body of the shrimp without excessive squeezing of the same. The rounded bottom surface on the head 56 is to prevent damage in case of air failure, during which time the head 56 might be in its lowermost position as shown in Fig. 9 and each post 49 would strike the head 56 as the table 15 continued to turn.

Means is provided for automatically releasing each of the clamping plates 40 just before table 15 has carried the shrimp to the tangent point to table 18 so as to release the shrimp for transfer from table 15 to table 18. As clearly shown in Figs. 1 and 6, this comprises a cam 70 mounted on a bracket 71 on base plate 10. This cam is positioned to strike a glancing blow to the lower end of each pin 44 as each station 16 passes the cam 70. The cam 70 then pushes the lower end of pin 44 radially inwardly for a distance sufficient to release the ratchet teeth 46 from the plate 47, whereupon the clamping plate 40 will jump upwardly under the influence of spring 43.

Means is provided for automatically transferring each shrimp from table 15 to table 18 as the shrimp passes the tangent point as shown in Fig. 6. Referring chiefly to Figs. 5, 6, 8, 10 and 11, a bar 72, one for each station 16, is mounted for reciprocation beneath table 15 by means of a bracket 73 embracing the bar. An L-shape bracket 74 extends upwardly from each bar 72 through a suitable slotted opening 75 in table 15. The bracket 74 extends radially outwardly and carries a shoe 76 at its outer end. Radially inwardly therefrom, a wire member 77 is rigidly secured to the bracket 74 and, as clearly seen in Fig. 6, this wire is bent to clear all obstruction and terminates in a generally radially extending portion 77a, the outer end of which lies radially perhaps a little farther outwardly from table 15 than the shoe 76. The end 77a of the wire 77 and the shoe 76 engage the shrimp during the pushing action to transfer the shrimp from table 15 to table 18. This action is brought about by means of a spring 78, the inner end of which is fixed to a pin 79 on the bar 72 while the outer end of each spring 78 is fixed. The means controlling each spring comprises a roller 80 which is rotatably mounted on a pin 81 which extends downwardly from the inner end of each rod or bar 72. Coacting with the series of rollers 80 is a spiral cam 82 which is fixed to the base plate 10. Referring to Fig. 6, it will be noted that the spring 78 farthest to the left is in relatively unstressed condition. As table 15 rotates in the direction of the arrows, cam 82 carries the roller 80 farther inward until the point 82a is reached. At this point there is a sharp shoulder provided in cam 82 extending in a direction parallel to the associated rods 72. As each roller 80 passes the shoulder at 82a, the cam 82 suddenly releases each spring 78, whereupon the rod 72 is moved suddenly outwardly so that the shoe 76 and the end 77a of wire 77 push the shrimp from a station 16 off of table 15 and onto an associated station on table 18.

The deveining operation is performed while the shrimp is clamped to table 15 at one of the stations 16 and during the period when the shrimp is traveling from a clamping station beneath cylinder 53 to the transfer station at the point of tangency of tables 15 and 18. To accomplish the deveining, the saw 17, previously mentioned, is mounted for normal position adjacent the periphery of table 15 after the table has turned about ninety degrees from the clamping station as indicated in dot-dash lines in Fig. 7 and is clearly seen in Fig. 1. The saw is mounted for rotation on shaft 83 which extends upwardly in a general vertical direction and is rotatable by an electric motor 84 at the upper end of the shaft. This motor is carried by arm 22 which was previously mentioned. The arm is bifurcated as indicated at 22a so as to provide two arms extending on opposite sides of motor 84. Pivot screws 85 support motor 84 in the arms 22a for oscillation. As clearly seen in Fig. 5, the pivots 85 are on a line radially inward from the center of gravity of the motor so that the weight of the motor, its shaft and the saw tend to oscillate the assembly in a counter-clockwise direction about the pivots 85 as viewed in Fig. 5. To limit this oscillation coacting stops 86 on the motor and 87 on arm 22 are provided so that the shaft 83 can move inwardly only to the vertical position as shown in full lines in Fig. 5. At this position, the inner periphery of the saw blades are adapted to enter the dorsal portion of the shrimp about one-quarter inch or a little less. This leaves the motor free to oscillate toward the dot-dash position indicated in Fig. 5 which allows the saw 17 to resiliently enter and cut the dorsal portion of each shrimp and to follow the curvature of the shrimp.

Figure 12:
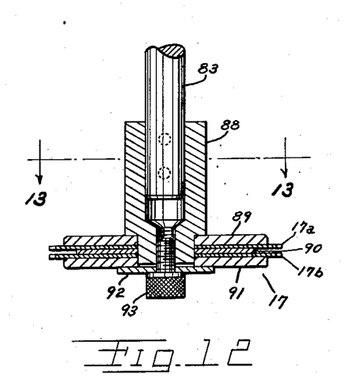
Figure 13:
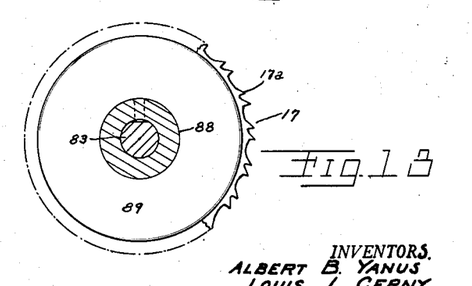
Fig. 13 is a fragmental view taken along the line 13—13 of Fig. 12.

The details of the saw 17 are clearly shown in Figs. 12 and 13. While a single saw blade might be used as has been the case in previous deveining devices, we prefer to use two parallel blades as clearly shown in Fig. 12. These blades are of very thin steel approximately one-sixty-fourth of an inch in thickness and spaced about one-sixteenth of an inch apart. A collar 88 is pinned to shaft 83. Against the shoulder on the lower end of this collar, there is assembled an annular saw backing member 89, blade 17a, an annular spacer 90, blade 17b, an annular backing member 91. A clamping washer 92 and screw 93 hold these parts tightly assembled against the collar 88. We prefer to form the blades 17a and 17b as indicated in Fig. 13 where the blades have rip saw teeth with every third tooth ground away so as to leave a clearance space which insures that the saw teeth will not become clogged with the flesh of the shrimp. If a shrimp is properly clamped at each of the stations 16, the vein of the shrimp will be at the horizontal level of the saw 17 and blades 17a and 17b will make clean cuts along the entire dorsal portion of the shrimp on opposite sides of the vein so that the vein is cleanly cut out. In this fashion, the vein is more cleanly removed from the shrimp than in devices previously known. A jet of water (not shown) may be provided to impinge along the groove cut by the saw 17, this jet being stationary and the body of the shrimp being carried past the jet immediately beyond the saw 17 so that the vein is cleanly washed out of the groove cut by the saw 17.

Referring now chiefly to Figs. 2, 3, 4 and 6, the deshelling table 18 is provided with a plurality of stations, in the present case fourteen stations, or the same number as there are stations 16 on table 15. At each station on table 18, there is a shrimp receiving shelf 94, adjacent which is a shrimp discharge recess 95. To properly position each shrimp on the shelf 94, each station is provided with a non-linear pusher blade 96 which is of a general curvature corresponding to the dorsal portion of a shrimp. The central portion of each blade 96 is rigidly connected to a relatively short rod 97 which extends a little bit angularly to a radius of table 18. Each rod 97 is held in a block 98 secured to table 18 in such a manner that the rod 97 may reciprocate in a suitable opening in block 98. The rear end of each rod 97 is provided with head 97a. A spring 99 embraces each rod 97 between the head 97a and the block 98 so that the pusher blade 96 is always biased inwardly.

Figure 4:
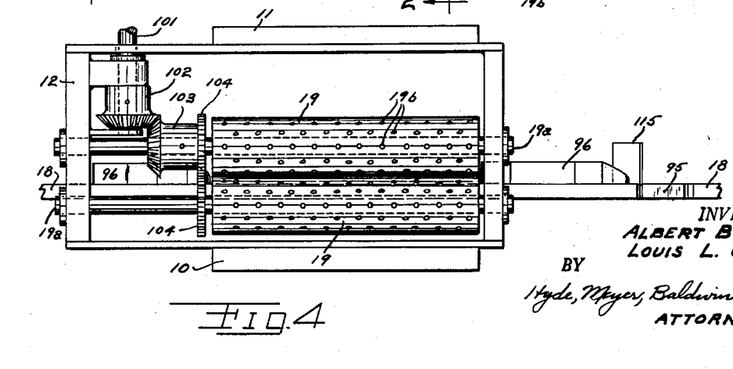
Fig. 4 is a fragmental end elevational view taken from the position of the line 4—4 of Fig. 3.

The deshelling rolls 19 are positioned approximately tangentially to the table 18 about one hundred eighty degrees from the transfer point. As clearly shown in Figs. 1 and 2, the bite of these rolls is slightly above the top surface of table 18. The bracket 12 is rigidly secured between base plate 10 on the bottom and the plate 11 on the top. This bracket provides parallel end walls in which the shafts bearing rollers 19 are rotatably mounted. An electric motor 100 is mounted on plate 11 and through suitable reduction gearing drives shaft 101 which extends vertically downward and is provided at its lower end with a bevel gear 102 which, as seen in Fig. 4, meshes with bevel gear 103 mounted on one of the shafts 19a which bears the upper roller 19. Inter-meshing pinions 104 on the upper and lower shafts 19a serve to drive the lower roller and to synchronize the rotation of the rollers. Preferably, the rollers 19 are rubber covered and a large number of shallow holes 19b are formed in the outer surfaces of the rollers so as to better grip the shell of the shrimp.

Means is provided for automatically pushing each shrimp toward the rollers 19 as the shrimp approaches that point when carried by table 18. To this end a kick lever 105 is pivotally mounted at 106 on a bracket 107 beneath plate 11. The lower end of lever 105 is adapted to engage each head 97a as each shrimp bearing station arrives opposite the rollers 19. A connecting rod 108 pivotally connected to lever 105 at the point 109 extends inwardly to a pivotal connection with a clevis 110 which in turn has an adjustable mounting at 111 on a lever 112 which in turn is pivotally mounted at 113 on the bracket 107. Mounted on the upper surface of table 18 is an annular cam 113 clearly seen in Fig. 2 and Fig. 3. This cam has alternate depressions 113a and projections 113b. A roller 112a rotatably mounted on the lower end of lever 112 is adapted to be actuated by the cam 113 as table 18 rotates. The arrangement of cam 113 is such that, as each shrimp bearing station of table 18 is approaching rolls 19, roller 112a rides up on one of the projections 113b so that levers 112 and 105 take the dot-dash position indicated in Fig. 2. At this time, the head 97a of the nearest pusher rod is also lying in the dot-dash position of Fig. 2 under the influence of spring 99. Just as the body of the shrimp comes opposite the rolls 19, the roller 112a leaves one of the projections 113b and snaps from the dot-dash position of Fig. 2 to the full line position there shown under the influence of a tension spring 114 which is connected between link 108 and bracket 107. This causes the lever 105 to give a sudden kick from the dot-dash position to the full line position shown in Fig. 2. This gives a sudden push to the pusher blade 96 so as to move the shrimp into the bite of rolls 19. Since the dorsal portion of the shrimp was toward the outside on table 15, when the shrimp body is transferred to table 18 the ventral side is outermost. When the parts are in the full line position of Figs. 2 and 3, the pusher plate 96 has moved the shrimp radially outwardly sufficiently that the feelers all along the ventral side of the shrimp and the tail are caught between the rollers 19. Since the shell has been cut entirely the full length of the shrimp along the dorsal side, the rollers 19 now pull the shell in between the rollers 19 leaving the flesh of the shrimp in a deshelled condition on the table side of the rolls. As table 18 continues to rotate in the direction of the arrow of Fig. 3, the shrimp body lying between table 18 and rolls 19 and held stationary by the deshelling operation of the rolls, soon lies over the recess opening 95 which immediately follows each table portion 94. The body of the shrimp then drops through the opening 95 to a chute or container below table 18 for receiving the completely processed shrimp. To insure that the body of the shrimp does not lie on the rolls 19, the trailing side of each recess 95 is provided with an upwardly extending pusher or sweeper 115 which extends upwardly sufficiently to catch the body of the shrimp if it remains lying close to the bite of the rolls 19. Each of these pushers 115 is secured to table 18 by means of a bracket 116. Each of the pushers 115 extends to the edge of table 18 or a very trifle beyond as shown in Fig. 3. This causes each pusher 115 to travel very close to the rolls 19 where table 18 is substantially tangent to rolls 19. Thus if any of the shrimp remain lying on the rolls 19, the pusher 115 carries the body of the shrimp along until it clears rolls 19 and drops down through the recess 95.

We have thus provided a machine where, using table 15 alone, shrimp may be deveined efficiently and rapidly with a minimum of labor, or, using tables 15 and 18, the shrimp may be deveined and deshelled and the only handling necessary is for the operator to hold the shrimp in proper position on the plate portion 38a until the clamping plate 40 has come down to clamping position at the clamping station.

As shown in Fig. 3, a nozzle 117 may be fixed in position to spray a washing stream on rolls 19 where they grip the shrimp so as to keep them clean enough to perform their function.

What we claim is:

1. Apparatus for deshelling shrimp, comprising conveyor means having an elongated shrimp receiving portion adapted to receive a shrimp having its dorsal side slit substantially from end to end and with the ventral side of the shrimp outwardly, a squeezing device operatively associated with said conveyor means and having a bite generally parallel to said portion on said conveyor means and in position to grip the ventral side of a shrimp on said conveyor means and means operatively associated with said conveyor adjacent said portion for causing relative approach movement between said squeezing device and a shrimp on said conveyor means opposite said squeezing device for causing movement of a shrimp from said conveyor means into the bite of said squeezing device.

2. The combination of claim 1 wherein said last named means comprises a pusher means operatively associated with said conveyor means for moving a shrimp from said conveyor means into the bite of said squeezing device.

3. The combination of claim 2 wherein said squeezing device comprises a pair of mutually engaging rolls operatively associated with said conveyor means, and means operatively connected with said rolls for rotating said rolls.

4. The combination of claim 1 including a deveining conveyor means operatively associated with said first named conveyor means to provide a transfer point between said conveyor means, cutting means operatively associated with said deveining conveyor means in position to engage and cut the shell of a shrimp along the dorsal side thereof, and means associated with one of said conveyors for transferring a shrimp from said deveining conveyor means to said first named conveyor means.

5. A combination of claim 4 wherein said cutting means comprises a rotatable blade operatively associated with said deveining conveyor means and rotatable in a horizontal plane in position to engage a shrimp on said deveining conveyor means, a motor above said blade having a depending rigid rotatable shaft connected with said blade, a frame for supporting said motor, and pivotal means mounting said motor in said frame, said pivotal mounting means being nearer than the center of gravity of said motor to a vertical plane projecting upwardly from a shrimp on said deveining conveyor means, whereby the weight of said motor urges said blade toward a shrimp on said deveining conveyor means.

6. The combination of claim 1 wherein said conveyor means is a circular table, a deveining conveyor means comprising a second circular table substantially tangent to said first named table, a plurality of clamping stations about the periphery of said second table, each station having clamping means adapted to hold a shrimp with its dorsal portion radially outwardly, a rotatable saw blade mounted in operative relationship with said second table in position to cut along the dorsal portion of a shrimp held in one of said clamping means, means for rotating said tables in timed relationship, means operatively associated with said second table and in timed relationship to the rotation thereof for releasing a shrimp at a clamping station before said tangent point is reached, means operatively associated with said second table and acting in timed relation to arrival of a clamping station at said tangent point for transferring a shrimp from said second table to said first named table with the ventral portion of the shrimp radially outwardly on said first named table.

References Cited in the file of this patent

UNITED STATES PATENTS

| Number | Name | Date |
|---|---|---|
| 59,472 | Stephens | Nov. 6, 1866 |
| 727,339 | Foster et al. | May 5, 1903 |
| 817,568 | Huther | Apr. 10, 1906 |
| 898,289 | Voorhies | Sept. 8, 1908 |
| 1,893,903 | Mullins | Jan. 10, 1933 |
| 1,953,558 | Harrild et al. | Apr. 3, 1934 |
| 2,034,691 | Bottker et al. | Mar. 24, 1936 |
| 2,092,262 | Rieske | Sept. 7, 1937 |
| 2,183,769 | Hawkins | Dec. 19, 1939 |
| 2,263,694 | Grayson | Nov. 25, 1941 |
| 2,301,729 | Krull | Nov. 10, 1942 |
| 2,429,828 | Lapeyre et al. | Oct. 28, 1947 |
| 2,463,918 | Stewart | Mar. 8, 1949 |
| 2,515,101 | Swinden | July 11, 1950 |
| 2,537,355 | Lapeyre et al. | Jan. 9, 1951 |

FOREIGN PATENTS

| Number | Country | Date |
|---|---|---|
| 24,301 | Great Britain | 1905 |